United States Patent [19]

Negishi

[11] Patent Number: 4,845,483
[45] Date of Patent: Jul. 4, 1989

[54] MALFUNCTION COMMUNICATING DEVICE FOR OPTICAL UNIT OF LASER PRINTER

[75] Inventor: Kiyoshi Negishi, Tokyo, Japan

[73] Assignee: Asahi Kogaku Kogyo Kabushiki Kaisha, Tokyo, Japan

[21] Appl. No.: 157,185

[22] Filed: Feb. 16, 1988

[30] Foreign Application Priority Data

Feb. 16, 1987 [JP] Japan .................................. 62-32869

[51] Int. Cl.⁴ ....................... G08B 23/00; H04Q 9/10; G11B 27/00
[52] U.S. Cl. ............................ 340/825.160; 340/557; 340/825.760; 346/76 L; 369/53
[58] Field of Search ................... 340/825.16, 679, 521, 340/555–557, 825.76, 870.12, 870.16; 346/76 L, 108, 160; 350/486, 6.1, 6.5; 358/296; 369/32, 44, 54, 53

[56] References Cited

U.S. PATENT DOCUMENTS

| | | | |
|---|---|---|---|
| 3,657,707 | 4/1972 | Mc Farland et al. | 350/486 |
| 4,669,072 | 5/1987 | Miura et al. | 346/76 L |
| 4,725,854 | 2/1988 | Ohtsuka et al. | 346/108 |
| 4,750,163 | 6/1988 | Yamamiya et al. | 369/44 |

Primary Examiner—Donald J. Yusko
Attorney, Agent, or Firm—Sughrue, Mion, Zinn, Macpeak & Seas

[57] ABSTRACT

A device for detecting and communicating the occurrence of malfunctions occurring in an optical unit of a laser printer or the like wherein the number of terminals needed for communicating multiple malfunction-indicating signals is reduced to one. Various malfunctions are indicated by signals of respective different frequencies. The pulse width of the single signal thus composed is detected to determine in an external processor the type of malfunction.

5 Claims, 2 Drawing Sheets

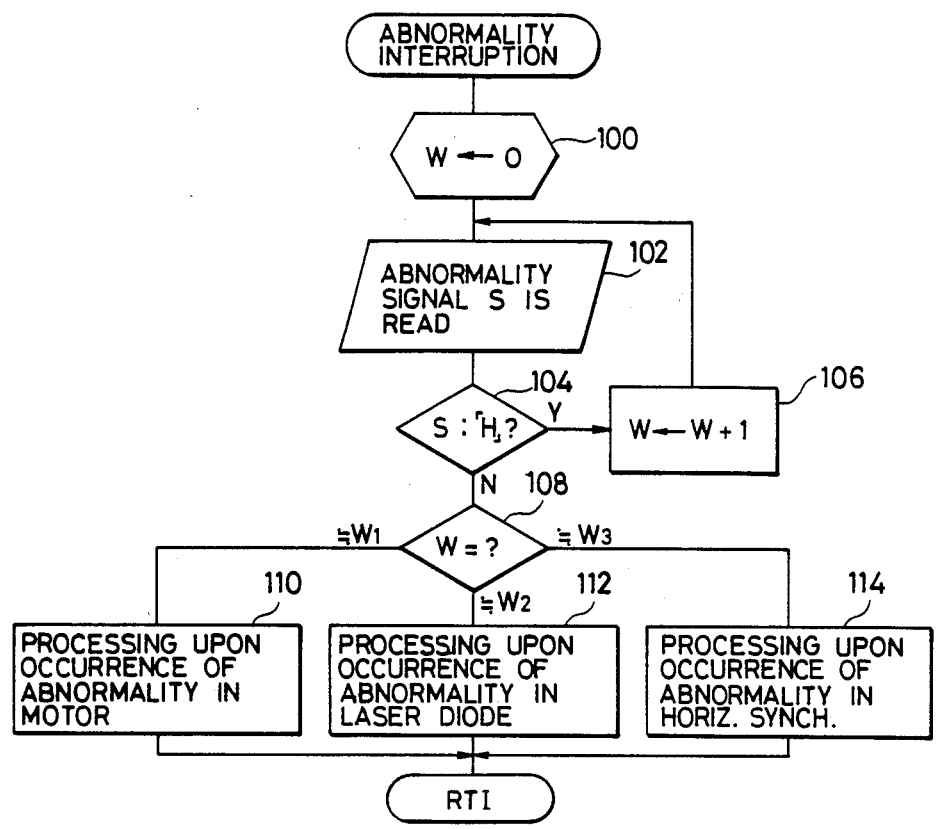
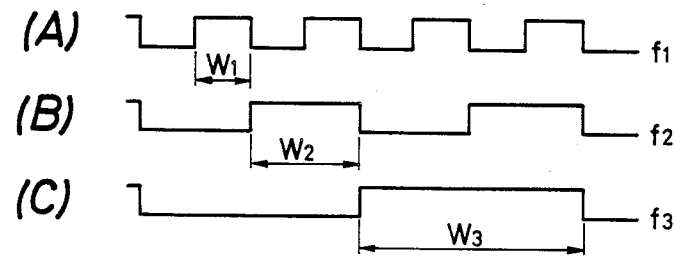

MALFUNCTION COMMUNICATING DEVICE FOR OPTICAL UNIT OF LASER PRINTER

BACKGROUND OF THE INVENTION

The present invention relates to a device for detecting malfunctions in the operation of the optical unit of a laser printer and transmitting data indicative of detected malfunctions to an external controller.

The optical unit of a laser printer generally includes a semiconductor laser, a collimator lens, a cylindrical lens, a polygonal mirror, an fθ lens, a laser drive circuit, an automatic power control (APC) circuit, a polygonal mirror rotator, a horizontal synchronizing signal generator, and an malfunction detection circuit. Since the optical unit and an external controller are connected to each other through a large number of signal lines and various power supply voltages, for example, +5 V, ±12 V and +24 V, are applied to the optical unit, it is desired to reduce the number of the signal lines and terminals to simplify the apparatus and decrease the cost thereof. Particularly, because the number of input and output lines of the external controller becomes very large as the number of functions of the laser printer is increased, it becomes increasingly important to reduce the number of input and output lines of the optical unit.

It is of course possible to reduce the number of signal lines by employing a serial signal. However, a separate synchronizing signal and control signal are then additionally required, and a parallel/serial converter and a serial/parallel converter must also be provided, so that the structure of the apparatus becomes more complex and the time required for signal transmission unduly lengthened.

SUMMARY OF THE INVENTION

The present invention has been made in order to solve the above-mentioned problems.

Accordingly, it is an object of the present invention to provide a device which transmits indications of malfunctions occurring in an optical unit of a laser printer having a generally simple construction and for which the number of external signal lines connected to the optical unit is reduced.

In accordance with the above and other objects, an malfunction signal transmitting device provided in accordance with the present invention is characterized by comprising means for detecting malfunctions occurring in the optical unit of a laser printer in which a laser beam is emitted from a semiconductor laser to perform main scanning; and malfunction signal generating means with which signals whose frequencies differ from each other in accordance with the types of malfunctions are sent out from a single terminal.

BRIEF DESCRIPTION OF THE DRAWINGS

FIG. 2 is a flowchart showing malfunction interrupt processing by a host microcomputer when an malfunction occurs; and FIG. 3 A-C shows waveforms of malfunction signals.

DESCRIPTION OF THE PREFERRED EMBODIMENTS

Figure 1:
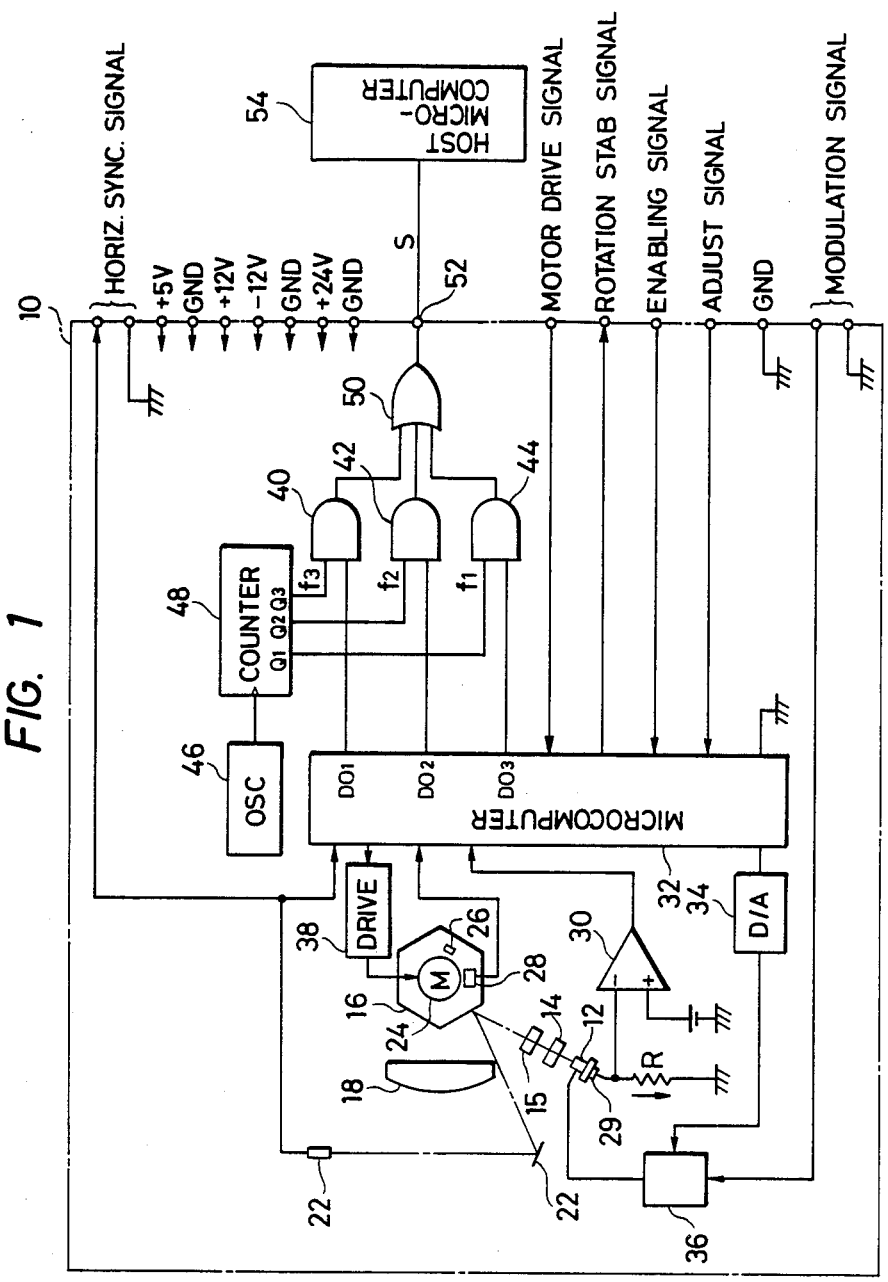
FIG. 1 is a schematic view of an optical unit to which the invention is applied.

A preferred embodiment of the present invention will hereafter be described with reference to the attached drawings.

As shown in FIG. 1, an optical unit 10 includes a laser diode 12, an optical system, a detector, and a drive unit, and a control circuit connected to the above elements. A collimator lens 14, a cylindrical lens 15 and a polygonal mirror 16 are sequentially disposed in front of the laser diode 12 so that a laser beam emitted from the laser diode is formed into a parallel beam whose cross section is circularly shaped by the cylindrical lens 15 before the beam is reflected by the polygonal mirror. The beam reflected by the polygonal mirror 16 is transmitted through an fθ lens 18 and projected from the optical unit 10 so that an image is formed on the surface of a photosensitive drum (not shown).

A mirror 20 is provided in front of the left edge of the fθ lens 18 and located outside an imaging zone for the photosensitive drum. When the laser beam is shown upon the mirror 20, a photosensor 22 provided in front of the right edge of the fθ lens 18 detects the irradiated beam and produces in response a horizontal synchronizing signal.

The polygonal mirror 16 is rotated by a motor 24. A magnetic sensor 28 provided in a fixed position detects the passing of a magnet 26 secured to the polygonal mirror 16 and produces a pulse in response indicating the rotational position of the polygonal mirror.

An automatic optical output control circuit is provided to maintain constant the intensity of the laser beam from the laser diode 12 even if the ambient temperature changes. A PIN photodiode 29 is provided behind the laser diode 12. A voltage is applied to the PIN photodiode 29 so that a photocurrent flows through the PIN photodiode depending on the intensity of the laser beam from the laser diode 12. The photocurrent is converted into a voltage by a resistor R. The voltage is applied to the inverting input terminal of a comparator 30 and there compared with a reference voltage. The output from the comparator 30 is supplied to a single-chip microcomputer 32, which supplies an adjustment value to a laser drive circuit 36 through a D/A converter 34 depending on the result of the comparison so as to control the laser drive current. In other words, the intensity of the laser beam from the laser diode 12 is controlled so that the output from the comparator 30 is inverted depending on the increase or decrease in the adjustment value.

The detection of malfunctions in the optical unit 10 will now be described.

A driving pulse is supplied from the microcomputer 32 to the motor 24 through a driver 38. If no rotation pulse is supplied from the magnetic sensor 28 to the microcomputer 32 corresponding to the driving pulse, the microcomputer judges the driver 38, the motor 24, the magnetic sensor or the combination of those elements to be abnormal and sends out a motor malfunction signal on an output terminal $DO_1$. As a result, the rotation of the motor 24 is stopped.

Also, if the output from the comparator 30 is not inverted despite automatic optical output control being carried out for a prescribed time, namely, when the intensity of the laser beam from the laser diode 12 cannot be converged to a set value, the microcomputer 32 judges the laser diode 12 or the like to be abnormal and sends out an LD malfunction signal on an output terminal $DO_2$.

Further, if the horizontal synchronizing signal is not supplied from the photosensor 22 to the microcomputer 32 correspondingly to the rotation pulse from the magnetic sensor 28, the microcomputer 32 judges the angle of the photosensor 22 to be abnormal (which can occur due to an externally applied shock or the like) or the photosensor itself to be abnormal and sends out a horizontal synchronization malfunction signal on an output terminal $DO_3$.

The input terminals of the optical unit 10 will now be described.

A +5 V terminal and a ground terminal are provided as power supply terminals for the digital circuit of the optical unit 10. A +12 V terminal, a −12 V terminal and a ground terminal are provided as power supply terminals for the analog circuit of the optical unit 10 and are used for powering the comparator 30, etc. A +24 V terminal and a ground terminal are provided as power supply terminals for the optical unit 10 to drive the motor 24. The signal input terminals of the optical unit 10, which are connected to a host computer 54 which controls the overall operations of the laser printer, are for a motor start signal, which is supplied to the microcomputer 32, an enabling signal, which is also a resetting signal, an automatic optical output control signal, and a modulation signal, which is supplied to the input terminal of the laser drive circuit. The signal output terminals of the optical unit 10, which are connected to the host microcomputer 54, are for the horizontal synchronizing signal, which is sent out from the photosensor 22, various malfunction signals, which are sent out from the microcomputer 32, and a rotation stabilization signal, which indicates that the rotation of the polygonal mirror 16 is stabilized.

In this embodiment, however, the number of signal lines for transmitting the malfunction signals is reduced to one so as to decrease the large number of signal input and output terminals of the optical unit 10.

A signal conversion circuit for supplying the various malfunction signals through a single signal line to the host computer 54 which controls the laser printer will now be described.

The output terminals $DO_1$, $DO_2$ and $DO_3$ are connected to first input terminals of AND gates 40, 42 and 44, respectively. The AND gates 40, 42 and 44 are opened by the motor malfunction signal, the LD malfunction signal and the horizontal synchronization malfunction signal, respectively. The output terminal of a clock pulse generator 46 is connected to the input terminal of a counter 48. Clock pulses produced by the clock pulse generator 46 are subjected to frequency division so that pulses of frequencies $f\theta$, $f\theta$ and $f\theta$ are sent out from the data output terminals $Q_1$, $Q_2$ and $Q_3$ of the counter 48, respectively. For example, the frequencies $f\theta$, $f\theta$ and $f\theta$ are typically 4 kHz, 2 kHz and 1 kHz, respectively. The data output terminals $Q_1$, $Q_2$ and $Q_3$ of the counter 48 are connected to the other input terminals of the AND gates 44, 42 and 40, respectively. The output terminals of the AND gates 40, 42 and 44 are connected to the input terminals of an OR gate 50 whose output terminal is connected to the input terminal $DI_1$ of the host microcomputer 54 through the output terminal 52 of the optical unit 10.

When the potential on the output terminal $DO_1$, $DO_2$ or $DO_3$ is at the high level, the AND gate 40, 42 or 44 is opened so that an malfunction signal S, namely, a sequence of pulses of the respective frequency $f\theta$, $f\theta$ or $f\theta$, is supplied to the host microcomputer 54 through the AND gate 40, 42 or 44 and the OR gate 50.

When the potential on the input terminal $DI_1$ is at the high level, the CPU of the host microcomputer 54 is interrupted and malfunction interrupt processing as shown in the flowchart of FIG. 2 is performed. In this processing, a pulse width W is cleared in a step 100, the malfunction signal S is read in a step 102, and it is judged in a step 104 whether or not the malfunction signal is at the high level. When it is judged in the step 104 that the malfunction signal S is at the high level, the value of the pulse width W is increased in a step 106 and the step 102 is again executed. In other words, the pulse width W is increased and measured while the malfunction signal S is at the high level. When it is judged in the step 104 that the malfunction signal S is at the low level, a step 108 is executed so that action is taken depending on the value of the pulse width W. That is, if the pulse width W is close to a value $W_1$, a step 110 is employed to issue a warning that there is an malfunction in the motor and to stop printing. If the pulse width W is close to a value $W_2$, a step 112 is executed to issue a warning that there is an malfunction in the laser diode or the like and to stop printing. If the pulse width W is close to a value $W_3$, a step 114 is executed to issue a warning that there is an malfunction in the horizontal synchronization and to stop printing.

With the pulse width W being measured through a software process as described above, the type of malfunction is detected with only one initial pulse. Also, the hardware of the host microcomputer is simplified. Moreover, the software routine used to implement the invention is quite simple.

Although conversion of the malfunction signals is performed in hardware in the above-described embodiment, the present invention is not limited to such an arrangement and may be embodied in other wasy. For example, a pulse can be directly supplied from the output terminal $DO_1$ of the microcomputer 32 to the input terminal $DI_1$ of the host microcomputer 54, and the width of the pulse altered through software. In that case, the number of malfunction signal output terminals of the microcomputer 32 can be reduced to one, and the components 40, 42, 44, 46, 48 and 50 dispensed with. With that arrangement, even if the number of types of malfunctions is increased, the number of malfunction signal output terminals of the microcomputer 32 will remain one. Moreover, the difference between the values $W_1$, $W_2$ and $W_3$ of the pulse width can be reduced to enable the host microcomputer 54 to distinguish between many types of malfunctions in a short time.

In the above-described embodiment, the various types of malfunctions are distinguished from each other through software as shown in FIG. 2. However, the present invention may be otherwise embodied in such a manner that the malfunction signal S is supplied to the input terminal of the counter, the pulses of the malfunction signal are counted for a prescribed time, and data are supplied from the three data output terminals of the counter to the three data input terminals of the host microcomputer 54. In that case, the types of malfunctions are distinguished from each other in terms of which input terminal is at a high level.

In the device provided in accordance with the present invention for transmitting signals indicating malfunctions in the optical unit of a laser printer, signals whose frequencies differ from each other in accordance with the types of malfunctions which occur in the optical unit are sent out from a single terminal. Accordingly, it is not necessary to send and receive a synchronizing signal and a control signal between the optical unit and the external controller. Thus, the number of signal lines connected between the optical unit and the external controller can be reduced to simplify the construction of the apparatus and reduce its cost.

In order to deal with the case where different malfunctions occur simultaneously, priorities may be provided to the different malfunctions, respectively, so as to detect the types of malfunctions occurring simultaneously. In this case, the highest priority should be given to the detection of an occurrence of malfunctions in the laser diode and the like.

What is claimed is:

1. A device for communicating signals representing malfunctions in an optical unit of a laser printer in which a laser beam is emitted from a semiconductor laser to perform main scanning, comprising: means for detecting said malfunctions; and malfunction signal generating means for producing a malfunction-indicating signal having a frequency differing in accordance with a type of malfunction detected by said detecting means, said malfunction-indicating signal being sent out from a signal output terminal.

2. The device for communicating signals representing malfunctions of claim 1, wherein said malfunction signal generating means comprises a frequency divider having a plurality of output terminals for signals of differing frequencies, and gating means for gating a signal from a respective one of said output terminals onto said signal output terminal in response to a signal indicative of a type of malfunction.

3. The device for communicating signals representing malfunctions of claim 2, further comprising means coupled to said signal output terminal for detecting a width of pulses of said malfunction-indicating signal.

4. The device for communicating signals representing malfunctions of claim 3, wherein said pulse width detecting means comprises processing means software-programmed to detect said width of said pulses by comparing a width of said pulses with a set of predetermined widths.

5. The device for communicating signals representing malfunctions of claim 1, further comprising means coupled to said signal output terminal for counting the number of pulses of said malfunction-indicating signal for a prescribed time, data being supplied from three data output terminals of said counting means, so that signal levels at said data output terminals represent the types of malfunctions.

* * * * *